(12) United States Patent
Osmun et al.

(10) Patent No.: US 7,754,972 B2
(45) Date of Patent: Jul. 13, 2010

(54) GROUNDED MANIFOLD AND METHOD FOR MAKING THE SAME

(75) Inventors: Nathan C. Osmun, Edgerton, OH (US); Joseph D. Davis, Bryan, OH (US)

(73) Assignee: Illinois Tool Works Inc., Glenview, IL (US)

( * ) Notice: Subject to any disclaimer, the term of this patent is extended or adjusted under 35 U.S.C. 154(b) by 876 days.

(21) Appl. No.: 11/640,553

(22) Filed: Dec. 18, 2006

(65) Prior Publication Data

US 2008/0145606 A1 Jun. 19, 2008

(51) Int. Cl.
*H01B 12/00* (2006.01)

(52) U.S. Cl. .................................................. 174/126.1

(58) Field of Classification Search ................. 174/377, 174/378, 376, 30, 31 R, 254, 255, 260, 137 R, 174/154, 177
See application file for complete search history.

(56) References Cited

U.S. PATENT DOCUMENTS

| | | | | | |
|---|---|---|---|---|---|
| 3,135,520 | A | * | 6/1964 | Borah | 277/627 |
| 3,796,623 | A | * | 3/1974 | Farnum et al. | 156/252 |
| 5,167,512 | A | * | 12/1992 | Walkup | 439/66 |
| 5,388,998 | A | * | 2/1995 | Grange et al. | 439/66 |
| 5,855,229 | A | | 1/1999 | Gluf, Jr. | |
| 6,033,233 | A | * | 3/2000 | Haseyama et al. | 439/66 |
| 6,150,616 | A | * | 11/2000 | Kazama | 174/267 |
| 2005/0250354 | A1 | * | 11/2005 | Vinther | 439/66 |

FOREIGN PATENT DOCUMENTS

EP 0797008 9/1997

OTHER PUBLICATIONS

European Search Report for 07122111.3.

* cited by examiner

*Primary Examiner*—William H Mayo, III
(74) *Attorney, Agent, or Firm*—Mark W. Croll; Paul F. Donovan

(57) ABSTRACT

A transmission manifold for an automobile is molded of material with low electrical conductivity. Ports are formed on opposite faces of the manifold, with a passage between a port on one face of the manifold and a port on an opposite face of the manifold. Electrically conductive inserts extend into the passage from the ports on opposite faces of the body, and an electrically conductive spring is compressed between the inserts, to establish continuous electrical contact between the first insert and the second insert.

20 Claims, 2 Drawing Sheets

GROUNDED MANIFOLD AND METHOD FOR MAKING THE SAME

FIELD OF THE INVENTION

The present invention relates generally to molded articles of non-conductive material and, more specifically, to structures within such molded articles for establishing ground connections between opposite sides of the article.

BACKGROUND OF THE INVENTION

In the automotive industry, alternative materials to metal are considered for many components in automobiles. Synthetic materials such as plastics can provide improved characteristics over metals for some components. For example, materials which are reactively inert to fluids used in the automobile can provide improved corrosion resistance and longer life. Further, some plastic components have inherent sound deadening qualities when compared to metallic components and strength or impact resistance qualities that are advantageous.

Alternative materials to metals are considered also for use in complex parts that can be expensive to manufacture of metal by machining, casting and finishing/polishing or the like. Molding techniques to create the parts from nonmetals can be performed quickly and efficiently when compared to previously used processes for metallic parts. For example, a transmission manifold may require a plurality of ports on opposite sides thereof, which can be complex and costly to manufacture completely from metal, and manufacturing a body of plastic with metal inserts can provide advantages. Metal components also can be heavier than similar parts from nonmetals. Accordingly, alternative materials may reduce weight and increase operating efficiency for the automobile, in addition to reducing costs and expenses for supplying the part.

Some components, including for example a transmission manifold, must provide a ground connection therethrough in the completed assembly. If the manifold or other component is manufactured of non-conductive material, establishing a ground connection from one side thereof to an opposite side thereof can present difficulties. It is known that some of the ports on opposite sides of a transmission manifold, for example, can provide a continuous passage through the manifold between opposite sides thereof. A metallic insert used in the port can be used to establish a ground connection from one side thereof to the other side thereof. However, the required shapes for such inserts are complex and may have opposite ends in axial non-alignment. Accordingly, a one-piece metallic insert can be complex, difficult to manufacture and install and expensive.

SUMMARY OF THE INVENTION

The present invention provides an apparatus and method of making the apparatus with a continuous passage from one side of a non-conductive body, such as a transmission manifold, to an opposite side of the non-conductive body, with conductive inserts secured and extending into the passage from opposite sides of the body. A space in the passageway between the inner ends of the inserts contains a compressed conductive spring establishing electrical contact with each insert on opposite ends of the spring.

In one aspect thereof, the present invention provides an electrically conductive assembly with a low conductivity body having first and second faces with first and second ports in the first and second faces. A first electrically conductive element extends into the body from the first port; a second electrically conductive element extends into the body from the second port, and an electrically conductive spring within the body is between and in electrically conductive contact with the first and second electrically conductive elements at opposite ends of the spring.

In another aspect thereof, the present invention provides a transmission manifold with a low electrical conductivity body having a first face and a second face on opposite first and second sides of the body. A first port is defined in the first face; a second port is defined in the second face, and a continuous passage is provided through the body from the first port to the second port. A first electrically conductive insert extends into the passage from the first port; a second electrically conductive insert extends into the passage from the second port, and an electrically conductive spring is disposed between and in electrical contact with the first and second inserts within the passage.

In a still further aspect thereof, the present invention provides a method for making a transmission manifold with steps of molding a transmission manifold body with first and second ports on opposite faces thereof, including forming one first port and one second port with a continuous passage therebetween; securing a first electrically conductive insert in one of the first and second ports; positioning an electrically conductive spring in electrically conductive contact with the first insert; securing a second electrically conductive insert in the other of the first and second ports; compressing the spring between the first and second inserts; and establishing continuous simultaneous electrical contact between the spring and each the first insert and the second insert within the passage.

An advantage of the present invention, in one form thereof, is providing a synthetic body establishing ground connection from one side to the other side.

Another advantage of the present invention, in one form thereof, is providing an efficient and cost effective structure for establishing electrical contact between opposite sides of a substantially non-conductive body.

Still another advantage of a form of the present invention is providing a transmission manifold of synthetic material with electrically conductive contact between one side thereof and an opposite side thereof.

Other features and advantages of the invention will become apparent to those skilled in the art upon review of the following detailed description, claims and drawings in which like numerals are used to designate like features.

Figure 1:
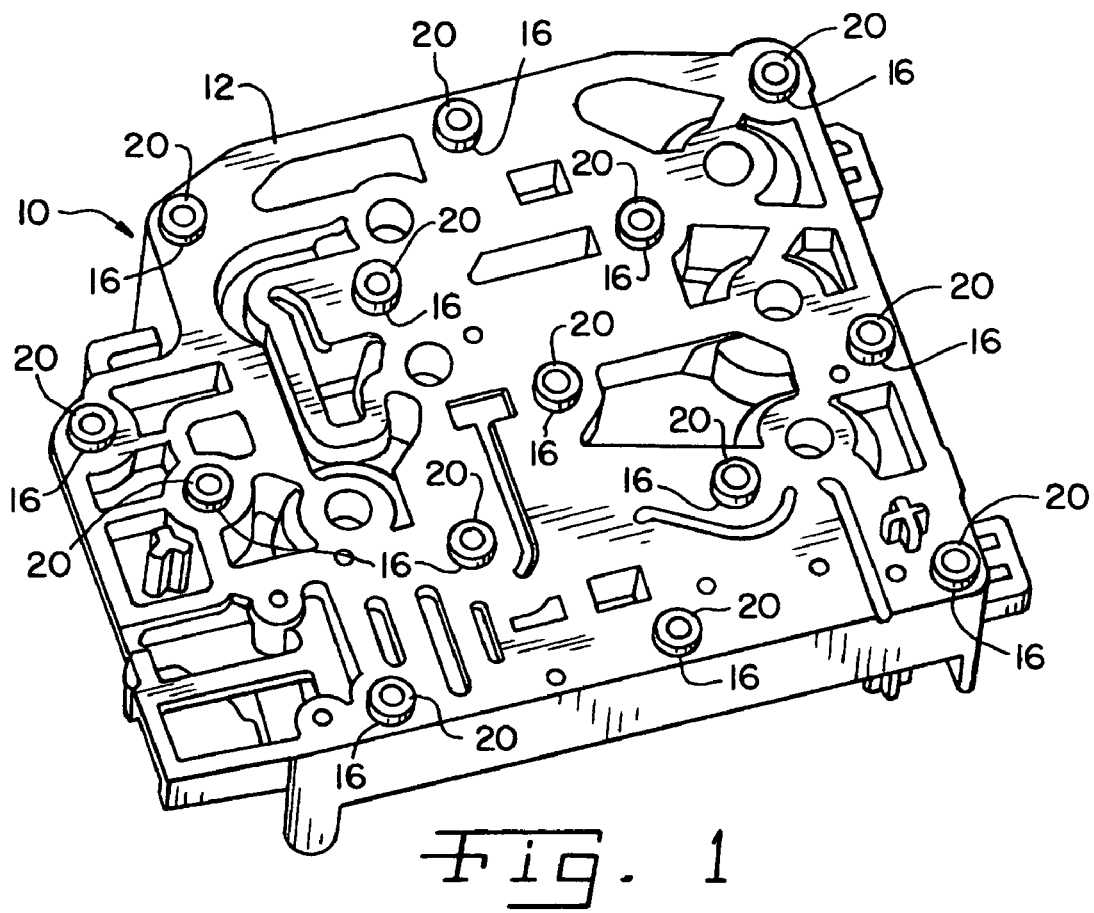
FIG. 1 is a perspective view of a transmission manifold made in accordance with the present invention.
Figure 4:
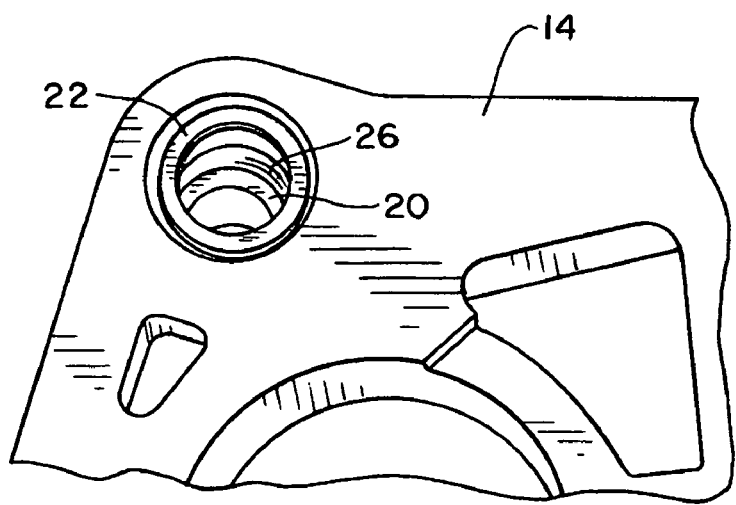
FIG. 4 is an enlarged perspective view of a port in a manifold in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates an automobile transmission manifold in accordance with the present invention. It should be understood that the particular configuration of a transmission manifold shown in the drawings is merely exemplary in nature, and the present invention can be used for transmission manifolds having other shapes and configurations. Further, while a transmission manifold is one advantageous use for the present invention, it is contemplated that other structures also can benefit from the use and application of the present invention.

Figure 2:
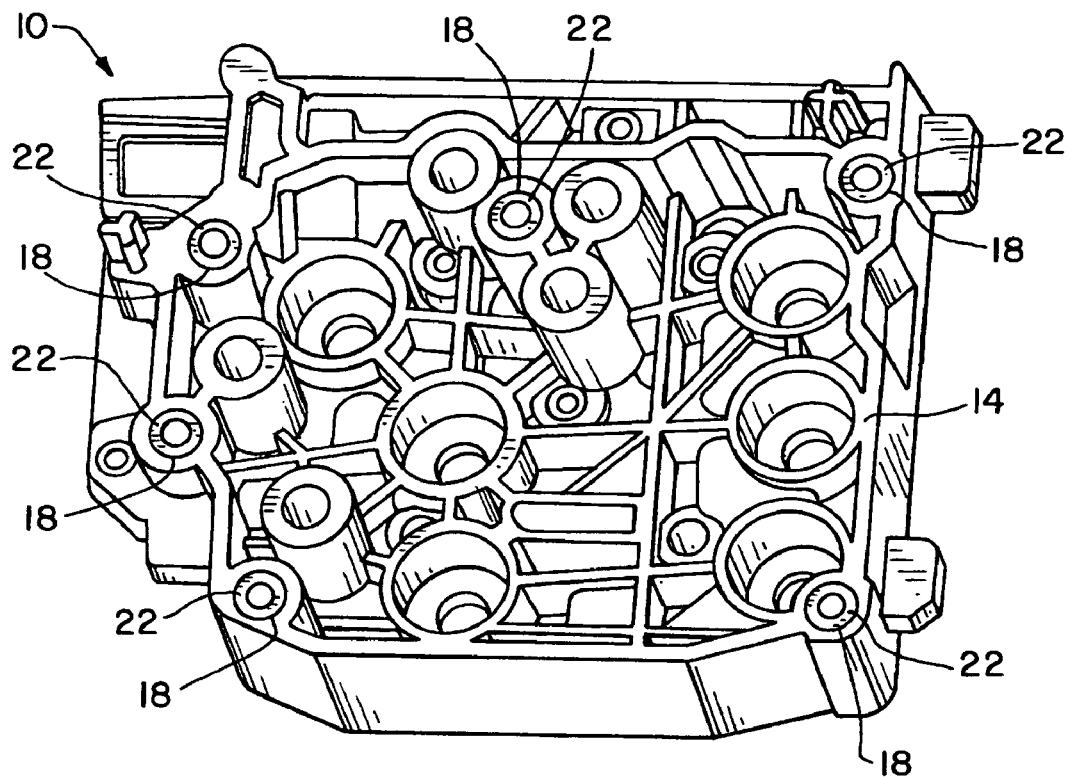
FIG. 2 is a perspective view of the transmission manifold shown in FIG. 1, illustrating the side opposite the side shown in FIG. 1.

Manifold 10 is a body of material of low electrical conductivity, such as plastic, and has a first face 12 and a second face 14 on opposite sides thereof. At least one first hole or port 16 is provided as an opening in first face 12. A plurality of first ports 16 is shown in FIG. 1. At least one second hole or port 18 is provided as an opening in second face 14. A plurality of second ports 18 is shown in FIG. 2. It should be understood that more or fewer first ports 16 and second ports 18 can be used for a specific manifold configuration.

First inserts 20 are disposed in first ports 16, and second inserts 22 are provided in second ports 18. Inserts 20 and 22 can be of different shapes, configurations and sizes as suitable for the port in which each is installed. Knurling or other surface treatments can be provided on outer surfaces of inserts 20 or 22 to enhance fixation within ports 16 and 18. Inserts 20, 22 are electrically conductive material, such as brass or other metal, whereas manifold 10 can be otherwise formed of substantially non-conductive material, such as plastic.

Figure 3:
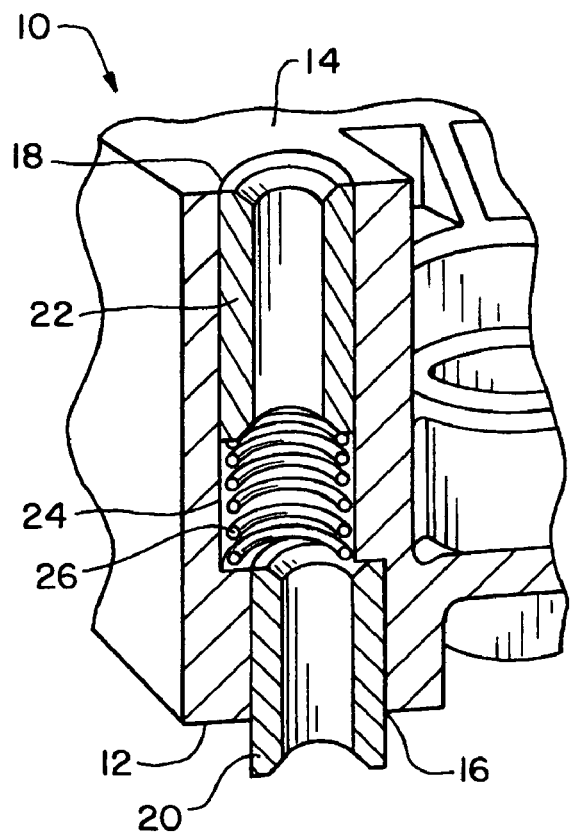
FIG. 3 is a fragmentary cross-sectional view through opposed ports of a manifold in accordance with the present invention.

As seen most clearly in FIG. 3, at least one first port 16 and one second port 18 are disposed generally across from one another, and a continuous passageway 24 is established from first port 16 in first face 12 to second port 18 in second face 14. In the exemplary embodiment shown, the first port 16 and second port 18 defining the continuous passage are in axial non-alignment.

An electrically conductive spring 26 is provided in passage 24, between first insert 20 and second insert 22. Spring 26 in the exemplary embodiment is a coil spring with a relaxed length longer than the free space in passage 24 between the inner ends of inserts 20 and 22. In the completed assembly, spring 24 is compressed between insert 20 and insert 22 to provide continuous electrical contact with each insert 20 and insert 22 on opposite ends of spring 26.

In the exemplary embodiment of FIG. 3, ports 16 and 18 are axially offset. Accordingly, spring 26 is retained between opposed inserts 20 and 22 in axial alignment with one insert 22 but not with the other insert 20.

A manifold of the present invention can be made by a variety of manufacturing techniques and processes. In one suitable process, manifold 10 is made by molding, during which the various first ports 16 and second ports 18 are formed. First inserts 20 are secured in first ports 16 during the molding process. Accordingly, first inserts 20 are secured in a fixture in the mold cavity, with the material for manifold 10 being molded thereabout. Such techniques are often referred to as overmolding. As the material for manifold 10 hardens or cures, intimate contact is established for securing first inserts 20 in the first ports 16 that are formed there around.

During the molding process, second ports 18 also are formed. Second inserts 22 can be secured by post mold inserting in second ports 18 after manifold 10 is removed from the mold in which molding occurs. A heated inserting process, using, for example, induction heating can be used. The insert 22 is heated by induction heating, and then forced into second port 18. It should be understood that heating processes other than induction heating can be used to heat an insert for insertion. The heated mass of second insert 22 softens the material of manifold 10 lining passage 24, allowing insertion and subsequent intimate contact between the manifold and the insert.

Each of the first inserts 20 and second inserts 22 can be secured as described. However, it should be understood that a variety of techniques can be used. For example, some or all of the first inserts 20 can be secured in manifold 10 by post mold insertion, using induction inserting other heated inserting process after the manifold is formed in a molding operation. For some uses of the present invention, other post mold inserting processes can be used, and may include pressing or inserting without heating.

To establish the necessary electrical continuity for a ground connection between first face 12 and second face 14, spring 26 is inserted into at least one set of a first ports defining a continuous passage 24 between a first port 16 and a second port 18. For example, after the first insert 20 is secured relative to first port 16, which may be by overmolding, spring 26 is inserted into second port 18. As second insert 22 is inserted into second port 18, spring 26 is encountered and compressed between and against the first and second inserts 20, 22. As illustrated in FIG. 3, spring 26 thereby establishes continuous electrical contact between first insert 20 and second insert 22.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electrically conductive assembly comprising:
a low conductivity body having first and second faces with first and second ports in said first and second faces;
a first electrically conductive element immovably positioned within said body in said first port and extending at least partially into said body from said first port;
a second electrically conductive element immovably positioned within said body in said second port and extending at least partially into said body from said second port; and
an electrically conductive spring positioned within said body in a permanently compressed state between and in electrically conductive contact with said first and second electrically conductive elements at opposite ends of said spring.

2. The assembly of claim 1, said spring being a coil spring.

3. The assembly of claim 1, said first and second electrically conductive elements being misaligned axially.

4. The assembly of claim 3, said spring being a compression coil spring.

5. The assembly of claim 1, said first and second electrically conductive elements being metal.

6. The assembly of claim 5, said first and second electrically conductive elements being misaligned axially.

7. The assembly of claim 5, said spring being a compression coil spring.

8. The assembly of claim 7, said first and second electrically conductive elements being in axial misalignment.

9. A transmission manifold comprising:
   a low electrical conductivity body having a first face and a second face on opposite first and second sides of said body;
   a first port defined in said first face, a second port defined in said second face and a continuous passage through said body from said first port to said second port;
   a first electrically conductive insert immovably affixed to said body within and extending at least partially into a first portion of said passage from said first port;
   a second electrically conductive insert immovably affixed to said body within and extending at least partially into a second portion of said passage from said second port; and
   an electrically conductive spring in a constant axially compressed state disposed between and in electrical contact with said first and second inserts within said passage.

10. The transmission manifold of claim 9, said first and second inserts being misaligned axially.

11. The transmission manifold of claim 9, including a plurality of first inserts in a plurality of first ports on said first side of said body, and a plurality of second inserts in a plurality of said second ports on said second side of said body.

12. The transmission manifold of claim 11 including only one said spring.

13. A method for making a transmission manifold comprising:
    molding a transmission manifold body with first and second ports on opposite faces thereof, including forming one first port and one second port with a continuous passage therebetween;
    securing a first electrically conductive insert in one of the first and second ports so as to be in continuous contact with said body;
    positioning an electrically conductive axially compressible spring in electrically conductive contact with the first insert;
    securing a second electrically conductive insert in the other of the first and second ports so as to be in continuous contact with said body;
    compressing the spring into a permanently compressed state between the first and second inserts; and
    establishing continuous simultaneous electrical contact between the spring and each the first insert and the second insert within the passage.

14. The method of claim 13, at least one of said securing steps performed by over molding.

15. The method of claim 13, at least one of said securing steps performed by post mold inserting.

16. The method of claim 13, one of said securing steps performed by over molding and the other of said securing steps performed by heating and inserting the insert.

17. The method of claim 16, said molding of said body forming said first and second ports in axial misalignment.

18. The method of claim 17, including:
    forming a plurality of the first ports and a plurality of the second ports;
    securing a plurality of first conductive inserts in the first ports;
    securing a plurality of the second inserts in the second ports; and
    compressing only one spring in a passage between one of said first inserts and one of said second inserts.

19. The method of claim 13, said molding of said body forming said first and second ports in axial misalignment.

20. The method of claim 13, including:
    forming a plurality of the first ports and a plurality of the second ports;
    securing a plurality of first conductive inserts in the first ports;
    securing a plurality of the second inserts in the second ports; and
    compressing only one spring in a passageway between one of said first inserts and one of said second inserts.

* * * * *